United States Patent [19]

Lien et al.

[11] 4,156,046
[45] May 22, 1979

[54] ULTRAVIOLET RADIATION PROTECTIVE, ABRASION RESISTANT, BLOOM RESISTANT COATINGS

[75] Inventors: Larry A. Lien, White Bear Lake; Ashwani K. Mehta, Saint Paul; Kathryn A. Soine, Cottage Grove; J. Lamar Zollinger, Maplewood, all of Minn.

[73] Assignee: Minnesota Mining and Manufacturing Company, Saint Paul, Minn.

[21] Appl. No.: 879,110

[22] Filed: Feb. 22, 1978

Related U.S. Application Data

[63] Continuation-in-part of Ser. No. 782,042, Mar. 28, 1977, abandoned.

[51] Int. Cl.$^2$ .................. B32B 27/38; B32B 27/20
[52] U.S. Cl. .................. 428/220; 260/45.8 NT; 260/45.95 F; 427/386; 427/387; 428/335; 428/336; 428/339; 428/413; 428/411; 428/425; 428/447; 428/451; 428/480; 428/913
[58] Field of Search .............. 428/413, 414, 415, 416, 428/417, 418, 411, 425, 447, 451, 480, 913, 220, 335, 336, 339; 427/386, 387; 260/45.8 NT, 45.95 F

[56] References Cited

U.S. PATENT DOCUMENTS

| | | | |
|---|---|---|---|
| 2,950,986 | 8/1960 | Bailey | 427/387 |
| 3,117,099 | 1/1964 | Proups | 260/2 A |
| 3,322,719 | 5/1967 | Peilstucker | 260/45.8 NT |
| 3,360,391 | 12/1967 | Richtzenhain | 428/413 |
| 3,868,613 | 2/1975 | Rogers | 428/413 |
| 3,914,512 | 10/1975 | Barrie | 428/413 |
| 3,925,509 | 12/1975 | Cooper | 260/45.95 F |
| 3,936,418 | 2/1976 | Pond | 260/45.8 NT |
| 3,955,035 | 5/1976 | Ito | 428/413 |
| 3,989,573 | 11/1976 | Sanjana | 428/413 |
| 4,049,861 | 9/1977 | Nozari | 428/413 |
| 4,049,867 | 9/1977 | Ito | 428/413 |
| 4,058,401 | 11/1977 | Crivello | 260/2 EC |
| 4,069,368 | 1/1978 | Deyak | 428/413 |

Primary Examiner—Ellis P. Robinson
Attorney, Agent, or Firm—Cruzan Alexander; Donald M. Sell; Mark A. Litman

[57] ABSTRACT

Abrasion resistant coatings based on epoxy-terminated silanes can reduce the transmission of ultraviolet radiation by at least 90% with the addition of ultraviolet radiation absorbers and 10–70% by weight of an aliphatic, polyepoxide, comonomer.

35 Claims, No Drawings

ULTRAVIOLET RADIATION PROTECTIVE, ABRASION RESISTANT, BLOOM RESISTANT COATINGS

This application is a continuation-in-part of U.S. Ser. No. 782,042, filed Mar. 28, 1977, now abandoned.

There are many different factors which can limit the durability of articles besides normal wear during use. Color fading, surface abrasion, and soiling, for example, can sufficiently diminish the aesthetics of an article so that it ought to be replaced. Some items such as photographs and works of art cannot be replaced when such damage has been wrought on them. Most organic materials, including dyes and pigment, are susceptible to degradation by light, the ultraviolet region of the electromagnetic spectrum (approximately 290 to 400 nm) being the most damaging radiation. As conventional fluorescent lighting emits some ultraviolet radiation in this region, avoidance of sunlight is not necessarily complete protection from such radiation. In the past, clear films of synthetic polymers containing ultraviolet absorbers have been used to protect certain items, including color photographs, against fading caused by ultraviolet radiation. The addition of such protective coatings, although reasonably effective against fading, have not provided protection against other deleterious effects such as abrasion and soiling. The coatings also must generally be able to provide impact resistance and flexibility, especially on an article such as a painting or color photograph.

U.S. Pat. No. 4,049,861 discloses abrasion resistant coatings based upon the polymerization of epoxy-terminated silanes. A high degree of abrasion resistance is provided by that technology. Australian Pat. No. 483,792 and U.S. patent application Ser. No. 764,817, filed Feb. 2, 1977 now U.S. Pat. No. 4,101,513 also disclose abrasion resistant coatings based on epoxy terminated silanes as does U.S. Pat. No. 3,955,035. The above identified U.S. Pat. No. 4,049,861 also discloses the use of the coatings on photographic films, the ability to provide flexibility with the coating, and the general utility of including ultraviolet absorbers in the coating, although the three respective disclosures are not specifically combined. Although ultraviolet absorbers can be added to the abrasion resistant coatings according to the teachings of the above identified applications, only limited concentrations of the ultraviolet absorbers can be readily retained in the generally described coatings of those inventions. The concentrations which can be used provide only limited protection against ultraviolet radiation. Larger concentrations cause "bloom" to form on the coatings, a white, dusty appearance in the film caused by the precipitation of the absorbers within the film coating or on the surface of the coating. This bloom appeared in compositions independent of the catalysts used, whether the highly fluorinated aliphatic sulfonylic or sulfonic catalysts of U.S. Pat. No. 4,049,861, the onium catalysts of U.S. patent application Ser. No. 764,817, the metal ester catalysts of Australian Pat. No. 483,792 or the Lewis acid catalysts of U.S. Pat. No. 3,955,035.

The present invention relates to an abrasion resistant, bloom resistant coating for use on substrates which are susceptible to damage from ultraviolet radiation, abrasion, and/or soiling. Abrasion resistant coatings derived from epoxy-terminated silanes are used in the practice of the present invention in combination with ultraviolet radiation absorbers.

The present invention copolymerizes epoxy-terminated silanes with aliphatic, polyepoxy materials to form abrasion resistant coatings which are able to retain sufficiently high concentrations of ultraviolet absorbers within the cured copolymer to provide effective ultraviolet absorbing, abrasion resistant, and soil resistant coatings, with significant bloom resistance. The epoxy terminated silane comprises 30–90% by weight of the reactive materials forming the final composition, the aliphatic polyepoxy materials comprise 10–70% by weight of the reactive materials, and 0–20% by weight of other copolymerizable materials may be included as reactive materials. It is preferred to have 50–80% epoxy-terminated silane, 10–50% polyepoxy material, and 0–10% comonomers. The ultraviolet radiation absorbitive materials, not included within the description of reactive materials (although some may be reactive during copolymerization and still provide ultraviolet radiation absorption) must be present in an amount sufficient to be absorptive of at least 90% of all radiation between 290 and 400 nm and be transmissive of at least 90% of all radiation between 400 and 780 nm with no less than 75% transmissivity of any 50 nm range between 400 and 780 nm. Preferably there is no less than 90% transmissivity over any 100 nm range between 400 and 780 nm. Any of the above described catalyst systems for the curing of epoxy-terminated silanes into abrasion resistant coatings may be used in the present invention. The preferred catalyst systems are the highly fluorinated aliphatic sulfonyl catalysts of U.S. Pat. No. 4,049,861 and the onium catalysts of U.S. patent application Ser. No. 764,817.

The thickness of the coatings in the present invention may be between 0.5 and 500 microns, the more preferred range being between 0.5 and 50 microns. The most preferred film thickness is between 1.0 and 20 microns.

Epoxy Terminated Silanes

Epoxy-terminated silanes are compounds or materials having polymerizable (preferably terminal) epoxy groups and terminal, polymerizable silane groups, the bridging of these groups being through a non-hydrolyzable aliphatic, aromatic, or mixed aliphatic-aromatic divalent hydrocarbon radical which may have N and/or O atoms in the radical chain. It is preferred to have no N atoms and most preferred to have O atoms only adjacent the epoxy group. The O atoms, for example, would be within the chain only as ether linkages. These radical chains may be generally substituted as is well known in the art, as substituents on the chain do not greatly affect the functional ability of the epoxy-terminated silanes to undergo the essential reactions necessary for polymerization through the siloxane or epoxy terminal groups. Examples of substituents which may be present on the linkage or bridging moieties are groups such as $NO_2$, alkyl (e.g., $CH_3(CH_2)_nCH_2$), alkoxy (e.g., methoxy), halogen, etc. In general structural formulae appearing within this description of the invention, such allowable substitution of the bridging moieties is included unless specifically excluded by language such as "unsubstituted divalent hydrocarbon radical."

Examples of preferred epoxy-terminated silanes useful in the practice of this invention are compounds of the general formulae:

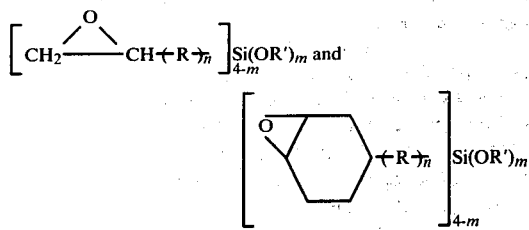

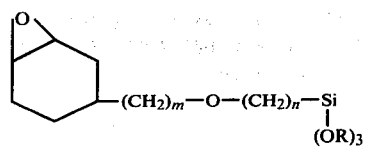

where R=a non-hyrolyzable divalent hydrocarbon radical (aliphatic, aromatic, or mixed aliphatic-aromatic containing) of less than 20 carbon atoms or a divalent radical of less than 20 carbon atoms composed of C, N, S, and O atoms (these atoms are the only atoms which should appear in the backbone of the divalent radicals), the oxygen being in the form of ether linkages. It is preferred to have no N atoms. No two heteroatoms may be adjacent within the backbone of the divalent hydrocarbon radicals. This description defines divalent hydrocarbon radicals for epoxy terminated siloxanes in the practice of this invention.

A more preferred formula definition of epoxy terminated silanes is

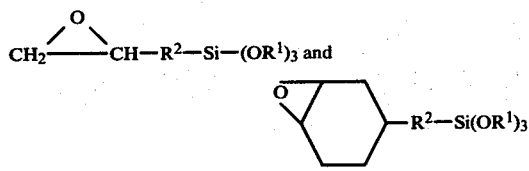

wherein $R^2$ is a non-hydrolyzable divalent hydrocarbon radical of fewer than 20 carbon atoms or a divalent group of fewer than 20 carbon atoms the backbone of which is composed of only C, N, S, and O atoms with no two adjacent heteroatoms, and $R^1$ is an aliphatic hydrocarbon group or acyl group of fewer than 10 carbon atoms.

The compositions employed in this invention can be an epoxy silane of the above formula in which n is from 0 to 1, R is any divalent hydrocarbon radical such as methylene, ethylene, decalene, phenylene, cyclohexylene, cyclopentylene, methylcyclohexylene, 2-ethylbutylene, and allene or an ether radical such as —CH$_2$—CH$_2$—O—CH$_2$—CH$_2$, —(CH$_2$—CH$_2$O)$_2$—CH$_2$—CH$_2$—,

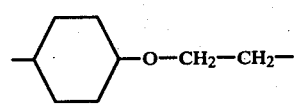

and —CH$_2$O—(CH$_2$)$_3$—, R' can be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula (CH$_2$CH$_2$O)$_k$Z in which k is an integer of at least 1, and Z is hydrogen.

The most preferred epoxy-terminated silanes are those represented by the formulae:

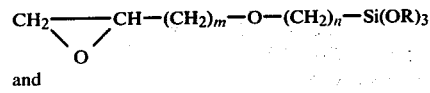

and wherein R is an alkyl group of up to 6 carbon atoms, and m and n are independently 1 to 6.

The compositions may additionally contain addenda such as surface active agents, viscosity modifiers, spreading aids, dyestuffs, etc. These may be blended with other epoxy terminated silanes and comonomers to adjust the physical properties of the final coating. Comonomers are those materials known in the art to be copolymerizable with epoxy groups or silane groups and include epoxies and silanes.

Catalysts

Catalysts in the present invention are generally used in amounts of from 0.01 to 10% by weight of the reactive ingredients in the curable composition. Preferably from 0.5 to 5% by weight is used, the amount varying with the particular catalyst used. The most preferred catalysts according to the present invention are highly fluorinated aliphatic sulfonylic catalysts and onium catalysts. The related highly fluorinated aliphatic sulfonic catalysts are very useful as are certain Lewis and Bronstad acids, but are less preferred. The sulfonic materials are defined as a highly fluorinated aliphatic sulfonic acid or salt thereof. Fluoroaliphatic sulfonic acids, methanes and imides and their preparation are disclosed in U.S. Pat. No. 4,049,861. The sulfonylic materials are defined as a compound containing two highly fluorinated aliphatic sulfonyl groups attached directly to an imide or methylene (e.g., —NR'— or

).

The sulfonic materials may be represented by the formula

wherein R is hydrogen, ammonium cation or metal cation and n is the valence of R.

The preferred sulfonylic catalysts may be represented by the formula

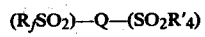

wherein Q is a divalent radical selected from

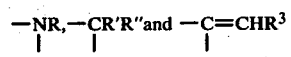

wherein R'' is selected from hydrogen, chlorine, bromine, iodine, R$_f$SO$_2$—, alkenyl of 3-4 carbon atoms, alkyl of 1 to 20 carbon atoms (preferably 1 to 4), aryl of 1 to 20 carbon atoms (preferably to 10, and for example, phenyl, naphthyl, pyridyl, benzthienyl, etc.), and alkaryl of 7 to 20 carbon atoms (preferably to 10), R' is selected from hydrogen, chlorine, bromine, iodine, ammonium cations or metal cations, and $R^3$ is H, alkenyl (3 to 4) carbon atoms or aryl up to 20 carbon atoms.

The catalysts wherein the N or C atom bonded to the highly fluorinated aliphatic (preferably alkyl) group has a hydrogen atom bonded thereto are active catalysts. Those having no hydrogen atom are latent and may be activated by heat, acid, chelating agent or combinations thereof as known in the art.

In the practice of this invention, $R_f$ and $R_f'$ are independently highly fluorinated aliphatic radicals which are defined as fluorinated, saturated, monovalent, aliphatic radicals having 1 to 20 carbon atoms. The skeletal chain of the radical may be straight, branched, or, if sufficiently large (e.g., at least 3 or 5 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has a formula $$C_xF_{2x+1}$$

wherein x has a value from 1 to 18.

The most preferred sulfonylic active catalysts of this invention are those compounds having the formula $$(R_fSO_2)-Q-(O_2SR_f')$$

wherein $R_f$ and $R_f'$ are independently a highly fluorinated alkyl group, and Q is a divalent radical selected from —NH— and —CHR—, wherein R is selected from Br, Cl, I, H, alkyl groups of 1 to 20 carbon atoms (preferably 1 to 4), alkenyl of 3 to 4 carbon atoms, aryl or aralkyl of up to 20 carbon atoms (preferably up to 10), or R'X, wherein R' is an alkylene group of up to 20 carbon atoms (preferably 1 to 4) and X is H, Br, Cl, I, —O$_2$SR$_f$, —CH(O$_2$SR$_f$)$_2$, $$-CH-(CH_2)_n-COOR^4,$$
$$|$$
$$Br$$

or —CY(COOR$^2$)$_2$ wherein R$^4$ is H or 1 to 8 alkyl and n is 0 to 8, and wherein R$^2$ is alkyl of 1 to 4 carbon atoms or phenyl-alkyl, the alkyl group of which has 1 to 4 carbon atoms, and Y is H, Br, Cl, I, or NO$_2$.

Ammonium cation as used in the present invention is defined as cations of ammonia, primary, secondary, tertiary and quaternary amines. Alkyl, aryl, alkaryl, etc., as used in the present invention (excluding $R_f$ type groups as elsewhere defined) includes such simple substituted groups as are recognized in the art as functional equivalents of the groups (e.g., —CH$_2$CH$_2$CH$_2$Cl;

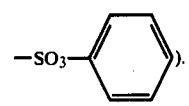
).

Selection of a most preferred perfluoroalkyl sulfonyl methane catalyst is dependent on the particular monomer compositions in which the catalyst is to be used and the application for which the composition is to be used.

Although their use is not necessary in the compositions of the invention to effect a cure of coatings of the composition, it is often preferable to include in addition to the fluoroalkylsulfonyl protonic acid catalysts from about 0.01 to 5 percent and preferably about 0.1 to 2 percent of a second siloxane hydrolysis and condensation catalyst. As is illustrated in the examples, some of such combination of catalysts provides synergistic effects allowing for increased rate of cure over that obtainable by the fluoroalkylsulfonyl protonic acid catalyst alone. Such siloxane hydrolysis and condensation catalysts are well known and are described in part in U.S. Pat. No. 4,049,861.

The metal ester catalysts useful in the present invention are metal esters of aluminum, titanium, or zirconium having at least two ester groups of the formula —OR directly bonded to the metal wherein R is hydrocarbyl of 1 to 18 carbon atoms, and more preferably alkyl or acyl of 1 to 8 carbon atoms. The remaining valences of the metal may be satisfied by organic moieties, inorganic moieties, complexing agents or even repeating —O—Ti—O— groups etc. (preferably, if remaining valences are not satisfied by OR groups, halides or alkyl groups are used). As long as two of the ester groups are present, the metal ester can react into the final polymeric structure and catalyze the reaction to form an abrasion resistant coating.

It is generally preferred that all valences of the metal are satisfied by ester groups, but the other groups may be present so long as at least two ester groups are present. Compounds of the formula $$R_n'M(OR)_{m-n}$$

are therefore useful, wherein R is as defined above,
m is the valence of M and n is 0, 1 or 2 such that m−n is always at least 2, and R' is an organic or inorganic moiety bonded to M or a complexing agent satisfying the valence requirements of M.

Compounds of the formula $$M(OR)_m$$

are generally preferred because of availability and generally improved characteristics. M is a metal, preferably titanium, aluminum, or zirconium.

It is critical that the metal ester not be hydrolyzed completely or hydrolyzed to a condition where less than two ester groups per titanium atom are present on the metal ester. If the metal ester is so hydrolyzed, the ambifunctional silane and the metal ester will coprecipitate into an insoluble material because reactive sites for the silane on the ester have been removed.

The onium catalysts which are preferred in the practice of the present invention are aromatic, organic adducts of an aromatic organoatomic cation of a Group Va, VIa, or VIIa atom particularly phosphorous, antimony, sulfur, nitrogen, and iodine atoms, and an anion.* Aromatic as used in the description of the groups on the onium catalysts as used in the present invention means an aromatic or heterocyclic ring (phenyl, naphthyl, substituted or unsubstituted 5, 6, or 7 membered heterocycle comprised of only C, N, S, O, and Se atoms with no more than one atom in the ring selected from S, O, or Se atoms) so attached to the nominative atom that it is at least as electron withdrawing as benzene. For example, phenacyl

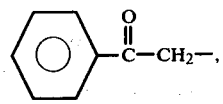

would be a useful aromatic group (being at least as electron withdrawing as benzene), but benzyl

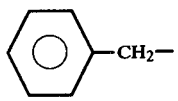

would not be as useful because of instability of the compound which would impair storage stability. Representative aromatic rings are phenyl, naphthyl, thienyl, pyranyl, furanyl and pyrazolyl, substituted or not.

*For purposes of convenience in describing these onium catalysts the Group Va, VIa, or VIIa atom that provides the major nomenclature for the adduct (e.g., phosphorous in phosphonium, sulfur in sulfonium, iodine in iodonium, etc.) will be called the nominative atom.

A descriptive formula for the onium catalysts of the present invention would be

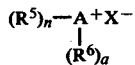

wherein $R^5$ is an aromatic group at least as electron withdrawing as benzene, $R^6$ is $R^5$ or alkyl (straight, branched, cyclic or substituted) or alkenyl having 1 to 18 carbon atoms, n is a positive whole integer of at least 1 (preferably 2) up to the valence of A plus one, a is 0 or a positive whole integer of up to the valence of A (preferably A minus 1), n plus a is equal to the valence of A plus one, A is a group Va, VIa, or VIIa atom, and X is an anion, with the proviso that when A is halogen, n is at least 2.

These onium materials are already known in the art. For example, Belgian Patent Nos. 833,472; 828,668; 828,669; and 828,670 show the use of certain onium compounds as cationic polymerization catalysts for specific monomers.

Other organo groups attached to the Group Va, or VIa nominative atom can be the same aromatic group or a substituted or unsubstituted alkyl or cycloalkyl group. The organo groups of up to 4 carbon atoms, R' is an alkyl group of up to 6 carbon atoms, and u is 0 or 1.

The presence of catalytic amounts of moisture has been found to be necessary in the initiation of the condensation of silanes with those catalysts. Atmospheric moisture will usually be sufficient, but water may be added to the system if desired or if polymerization is needed in the absence of air for any particular application.

Examples of suitable onium salts include, but are not limited to:

A. Onium Salts Having a Periodic Group Va Cation 4-acetophenyltriphenylammonium chloride
Diphenylmethylammonium tetrafluoroborate
Tetra(4-chlorophenyl)phosphonium iodide
Tetraphenylphosphonium iodide
Tetraphenylphosphonium hexafluorophosphate
(4-bromophenyl)triphenylphosphonium hexafluorophosphate
Tetraphenylarsonium tetrafluoroborate
Tetraphenylbismonium chloride
Di-(1-naphthyl)dimethylammonium tetrafluoroborate
Tri-(3-thienyl)methylammonium tetrafluoroborate
Diphenacyldimethylammonium hexafluorophosphate Examples of these and other onium salts and their preparation are disclosed in Belgian Patent No. 828,668.

B. Onium Salts Having a Period Group VIa Cation

Triphenylsulfonium hexafluoroantimonate
4-chlorophenyldiphenylsulfonium tetrafluoroborate
Triphenylsulfonium iodide
4-cyanophenyldiphenylsulfonium iodide
Triphenylsulfonium sulfate
2-Nitrophenylphenylmethylsulfonium sulfate
triphenylsulfonium acetate
Triphenylsulfonium trichloroacetate
Triphenyl teluronium pentachlorobismutate
Triphenyl selenonium hexafluoroantimonate Examples of these and other onium salts having a Periodic Group VIa cation and their preparation are given in Belgian Patent Nos. 828,670 and 833,472 and U.S. patent application Ser. No. 609,897, filed Sept. 2, 1975.

C. Onium Salts Having a Periodic Group VIIa Cation

Diphenyliodonium iodide
4-Chlorophenylphenyliodonium iodide
Diphenyliodonium chloride
4-Trifluoromethylphenylphenyliodonium tetrafluoroborate
Diphenyliodonium sulfate
Di(4-methoxyphenyl)iodonium chloride
Diphenyliodonium trichloroacetate
4-methylphenylphenyliodonium tetrafluoroborate
Diphenylbromonium chloride
1-(2-carboethoxynaphthyl)phenyliodonium chloride
2,2'-Diphenyliodonium hexafluorophosphate Examples of these and other halonium salts and their preparation are disclosed in Belgian Pat. No. 828,669 and Belgian Pat. No. 845,746.

The compositions of the invention can be prepared by mixing the onium salt with the epoxy terminated silane composition until a solution is formed. Because many of the onium salts have limited solubility in the silicon-containing compound, it is often preferable to first dissolve the onium salt in a liquid diluent that is inert to the components of the composition and then mix this solution into the reactive composition. Suitable inert diluents include alcohols such as ethanol, esters such as ethyl acetate, ethers such as diethyl ether, halohydrocarbons such as dichloroethane, and nitriles such as acetonitrile. For storage stability, these solvents and the solutions must be anhydrous.

The aromatic iodonium salts are of the formulae:

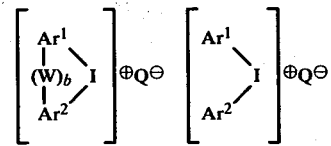

wherein $Ar^1$ and $Ar^2$ are aromatic groups having 4 to 20 carbon atoms and are selected from phenyl, naphthyl, thienyl, furanyl and pyrazolyl groups; W is selected from

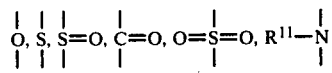

where $R^{11}$ is aryl of 6 to 20 carbon atoms or acyl of 2 to 20 carbon atoms (such as phenyl, acyl, benzoyl, etc.); a carbon-to-carbon bond; or $R^{12}$-C-$R^{13}$, where $R^{12}$ and $R^{13}$ are selected from hydrogen, alkyl groups of 1 to 4 carbon atoms, and alkenyl groups of 2 to 4 carbon atoms; and b is zero or 1; and Q is a halogen-containing complex anion selected from tetrafluoroborate, hexafluorophosphate, hexafluoroarsenate, hexachloroantimonate and hexafluoroantimonate; a fluoroaliphatic sulfonic acid; a bis-(fluoroaliphaticsulfonyl)methane; or a bis(fluoroaliphaticsulfonyl)imide.

Preferred compounds from this group include those where n=0. Further preferred materials have $Ar^1$ and $Ar^2$ as a phenyl group.

The aromatic sulfonium salts are of the formulae:

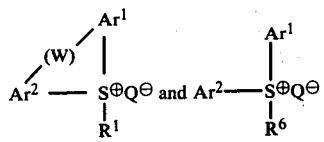

wherein $Ar^1$ and $Ar^2$ can be the same or different, selected from aromatic (as defined above for aromatic iodonium salts) and $R^6$, W and Q are the same as defined before. Preferred compounds of this class are those in which $Ar^2$ and $R^1$ are phenyl.

Suitable examples of the preferred aromatic onium salt photocatalysts include:
diphenyliodonium tetrafluoroborate
diphenyliodonium hexafluorophsophate
diphenyliodonium hexafluoroarsenate
diphenyliodonium hexachloroantimonate
diphenyliodonium hexafluoroantimonate
diphenyliodonium bis(trifluoromethylsulfonyl)methane Other suitable preferred aromatic onium salt photocatalysts are the corresponding triphenylsulfonium salts. Still other preferred salts are listed in Belgian Pat. No. 845,746 and include triarylsulfonium hexafluorophosphate, tritolylsulfonium hexafluorophosphate, methyldiphenylsulfonium tetrafluoroborate, etc.

The aromatic onium salt photocatalysts useful in the photopolymerizable compositions of the invention are of themselves photosensitive only in the ultraviolet. They are latent catalysts which must be mixed with the reactants then activated by irradiation. They can be further sensitized to the near ultraviolet and the visible range of the spectrum by sensitizers for known photolyzable iodonium compounds in accordance with the teachings of U.S. Pat. No. 3,729,313.

Polyepoxy Compound

Polyepoxy compounds according to the present invention have the formula:

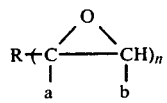

wherein R is an aliphatic or cycloaliphatic radical such that the epoxy compound has a molecular weight of at least 100 per epoxy group to prevent bloom. It is more preferred to be a compound having a molecular weight of at least 150 per epoxy group to add significant flexibility improvement. Aliphatic and cycloaliphatic refer to hydrocarbons which also may have ether and ester oxygens and thio ether groups therein. n is the valence of R and is an integer of 2 to 6 (preferably 2). a and b are H or, when fused together, the atoms necessary to form a 5- or 6-member cycloaliphatic ring. R is preferably selected so that the flexibilizing epoxy compound, upon homopolymerization provides a polymer having a glass transition temperature ($T_g$) below $-25°$ C.

Useful polyepoxides which are also flexibilizing epoxies within this definition further include those which contain one or more cyclohexene oxide groups such as the epoxycyclohexanecarboxylates, typified by 3,4-epoxycyclohexylmethyl 2,4-epoxycyclohexanecarboxylate, 3,4-epoxy-2-methylcyclohexylmethyl 3,4-epoxy-2-methylcyclohexanecarboxylate, and bis(3,4-epoxy-6-methylcyclohexylmethyl) adipate. For a more detailed list of flexibilizing epoxy compounds according to the present invention, see U.S. Pat. No. 3,117,099, particularly column 2, line 59 - column 4, line 22, which is incorporated herein for that disclosure.

Other useful flexibilizing epoxy compounds include polyglycidal ethers of aliphatic polyols such as 1,4-butanediol diglycidyl ether, 1,6-hexanediol diglycidyl ether, diethyleneglycol diglycidyl ether, triethyleneglycol diglycidyl ether, polypropyleneglycol diglycidyl ether (e.g., "ERL-4050" and "ERL-4052" from Union Carbide Corp.), diglycidyl ether of 2,5-dioxanediol, and the triglycidyl ether of trimethylolpropane; epoxidized polyolefins such as dipentene dioxide (e.g., "ERL-4269" from Union Carbide Corp.) and epoxidized polybutadiene (e.g., Oxiron 2001 from FMC Corp.). Other useful aliphatic polyepoxy compounds are disclosed in *Handbook of Epoxy Resins*, McGraw-Hill Brook Co. (1967).

Ultraviolet Absorbers

Ultraviolet absorbers within the preferred practice of this invention fall into the following classes: BENZOPHENONES: This class comprises substituted 2-hydroxybenzophenones. They are available with a variety of substituents on the basic molecule to provide proper compatibility, non-volatility, and particular absorption properties. Typical substituted 2-hydroxybenzophenones are 2-hydroxy-4-methoxy-benzophenone, 2-hydroxy-4-octyloxybenzophenone, 4-dodecycloxy-2-hydroxybenzophenone, and and 2,2'-dihydroxy-4,4'-dimethoxybenzophenone. The art recognizes substituted 2-hydroxybenzophenones as a class.

BENZOTRIAZOLES

This class comprises derivatives of 2-(2'-hydroxyphenyl)benzotriazole. Typical examples are 2-(2'-hydroxy-5'-methylphenyl)benzotriazole and 2-(2'-hydroxy-5'-t-octylphenyl)benzotriazole. Substituted 2-(2'-hydroxyphenyl)benzotriazoles are also an art recognized class of ultraviolet radiation absorbers.

SUBSTITUTED ACRYLATES

These are another art recognized class of UV absorbers. Typical examples are ethyl-2-cyano-3,3-diphenyl acrylate, 2-ethylhexyl-2-cyano-3,3-diphenyl acrylate, and p-methoxy-benzylidene malonic acid dimethyl ester.

ARYL ESTERS

This art recognized class includes aryl salicylates, benzoates, and esters of resorcinol. Typical examples are phenyl salicylate, p-t-octylphenyl salicylate, resorcinol monobenzoate, and 2,4-di-t-butylphenyl-3,5-di-t-butyl-4-hydroxybenzoate. Combinations of these UV absorbers are often used to aggregate the properties of the individual absorbers. Preferred absorbers are (I) 2,4-dihydroxybenzophenone, (II) 2,2'4,4'-tetrahydroxybenzophenone, (III) 2-(2'-hydroxy-5-methylphenyl)-benzotriazole and (IV) 2-(3', 5'-di-t-amyl-2'-hydroxyphenyl)benzothiazole.

Reference to the following examples will provide further understanding of the present invention.

EXAMPLE 1

A coating formulation (A) was prepared in the following manner. 6.0 grams of γ-glycidoxypropyltrimethoxysilane were partially hydrolyzed (40% methoxy groups removed) and stripped of volatiles. 4.0 g diglycidyl ether of 1,4-butane diol was added to the partial hydrolyzate alone, with 0.1 g of bis(trifluoromethylsulfonyl)phenylmethane in ethyl acetate, 0.01 g of an inert, fluorinated oligomeric leveling agent, 8.89 g of ethyl acetate and 1.0 grams of 2,4-dihydroxybenzophenone.

A second coating formulation (B) was prepared as above for A, except no UV absorber was added. Two color photographs were coated with formulations A and B, respectively, using a #22 wire wound steel coating rod. The coatings were allowed to cure at room temperature for 4 hours, then placed under a 200 watt medium pressure mercury ultraviolet lamp, aloang with an uncoated color photograph. After 7 hours, the uncoated photo and the photo with coating B had begun to fade, but no fading was observed on the color photograph coated with formulation A. After 17 hours of irradiation, servere fading and color destruction had taken place on the uncoated photograph and the photograph coated with formulation B, but no fading or color change was observed on the photo coated with the A formulation containing the UV screen I. The photographs coated with A and B were highly resistant to abrasion by steel wool (#000), and wiping with a wet paper towel.

EXAMPLE 2

Coating formulations were prepared as in Example 1, except that the following UV absorbers and amounts were employed:

| Formulation | UV Absorber |
|---|---|
| B | None |
| C | 0.2 g (2%) of I |
| D | 0.2 g (2%) of II |
| E | 0.2 g (2%) of IV |

Following the procedure of Example 1, coatings were applied to color prints which had a white background and areas of pure cyan, magenta and yellow. These coated photographs were placed under a 275 watt GE sunlamp (ten inch distance). After 2 days of irradiation it was noted that the cyan region of the B coated print had faded, and the background white was turning yellow. The C, D, and E coated prints showed little if any change. The visual ratings after 4 days irradiation are given below in Table I.

Table I

| Coating | UV Absorber | White Background | Cyan | Yellow | Magenta |
|---|---|---|---|---|---|
| B | None | V. Yellow | Badly Faded | Sl. Paler | Sl. Bluer |
| C | I | V. Sl. Yellow | No Change | Sl. Fading | No Change |
| D | II | " | Sl. Fading | No Change | Sl. Fading |
| E | IV | " | Sl. Fading | Sl. Fading | No Change |

EXAMPLE 3

In the following example, 100% solids, UV cured protective coatings are described.

The formulations (F through K) described in Table II were coated with a #3 wire wound rod on the color prints described in Example 2. The coatings were cured immediately under a 200 watt medium pressure mercury UV lamp for 40 seconds, followed by heating at 60° C. for 10 minutes. An uncoated color photographic print was used for comparison Table II

| Ingredient/Formulation (Grams) | F | G | H | J | K | |
|---|---|---|---|---|---|---|
| $CH_2\text{—}CHCH_2O(CH_2)_3Si(OMe)_3$ (epoxide) | 6 | 6 | 8 | 6 | 6 | Color |
| $CH_2\text{—}CHCH_2O(CH_2)_4OCH_2CH\text{—}CH_2$ (diepoxide) | 3 | 3 | 1 | 4 | 2 | Print |
| bis-cyclohexene oxide methyl carboxylate structure | 1 | — | 1 | — | 2 | Only- |
| bis-methylcyclohexene oxide adipate structure | — | 1 | — | — | — | No |
| $(C_6H_5)_3S\ SbF_6$ | 0.2 | 0.2 | 0.2 | 0.2 | 0.2 | Coat- |
| Inert fluorocarbon surfactant | 0.02 | 0.02 | 0.02 | 0.02 | 0.02 | ing |

Table II-continued

| | | | | | |
|---|---|---|---|---|---|
| UV Absorber IV | 0.3 | 0.3 | 0.3 | 0.3 | 0.3 |

Properties

| | | | | | |
|---|---|---|---|---|---|
| Steel Wool Abrasion Resistance | vg | g | vg | g | g  poor |

After 5 days irradiation under a 275 watt sunlamp at 25.4 cm distance from the film, all coated samples showed only very slight, but tolerable fading. The uncoated film showed a page yellow coloration in the white background areas, considerable fading in the cyan region, moderate fading in the magenta region, and only slight fading in the yellow region.

EXAMPLE 4

Rigid poly(vinylchloride) sheet can also be protected according to the present invention. In this example a primer was found to be desirable to enhance the bond between the UV absorber containing abrasion resistant coating and the sheet. A terpolymer of ethylmethacrylate, butyl acrylate, and methacryloxypropyltriethoxysilane (80:17:3, respectively) was applied from a 10% solids solution in toluene/ethylacetate (50/50) using a number 14 wire wound applicator rod, then dried for one hour at room temperature before application of the overcoat.

After priming, the abrasion resistant coatings (with or without necessary modifiers as later described) were applied from a 50% solids solution in ethyl acetate using a number 14 wire wound applicator rod. The coatings were allowed to cure to 5 days at room temperature. All abrasion resistant coating constructions exhibited good crosshatched adhesion (at least 85%) and excellent abrasion resistant to steel wool in comparison with poly(vinylchloride).

Three constructions were compared: A) a control (having no abrasion resistant coating); B) an abrasion resistant coating with UV abosrbers but no flexibilizing epoxy material; and C) an abrasion resistant coating with UV absorbers and flexibilizing epoxy materials. The compositions of the coatings used in B and C were:

| Component | B (parts) | C (parts) |
|---|---|---|
| γ-glycidoxypropyltrimethoxysilane | 10.0 | 6.0 |
| Diglycidylether of 1,4-butane diol | — | 4.0 |
| 2,4-Dihydroxybenzophenone | 2.0 | 2.0 |
| Ethyl acetate | 12.0 | 12.0 |
| Trifluoromethylsulfonylphenylmethane | 0.1 | 0.1 |
| Inert fluorinated oligomeric surfactant | 0.01 | 0.01 |

The Examples were treated in cycles by placing them 10 inches (25.4 cm) from a 275 watt sunlamp for 4 hours then immersing them in water for 4 hours. The results were as follows:

| 20 hours | A | Light brown discoloration |
|---|---|---|
| | B | Hairline cracks on surface |
| | C | No change |
| 95 hours | A | Brown discoloration throughout |
| | B | Surface thoroughly cracked but no discoloration |
| | C | No change |
| 650 hours | A | Sample dark brown and opaque |
| | B | Severe cracking |
| | C | Small hairline cracks begin to appear |
| 800 hours | A | Total failure of sample |
| | B | Large cracks and slight discoloration appearing in coating |
| | C | Some more cracking, but no discoloration |

EXAMPLES 5–15

The following materials were used in these examples.
A. γ-glycidoxypropyltrimethoxysilane
B. A 40% hydrolyzed precondensate of γ-glycidoxypropyltrimethoxysilane
C. 1,4-butanediol diglycidylether
D. 3,4-epoxycyclohexylmethyl 3,4-epoxycyclohexane carboxylate
E. bis(2-methyl-3,4-epoxycyclohexylmethyl)succinate
F. 2-(2'-hydroxy-5'-methylphenyl)benzotriazole (5% in isopropylacetate)
G. 2-(3', 5'-di-t-amyl-2'hydroxyphenyl)benzotriazole (10% in isopropylacetate)
H. Isopropylacetate
I. Inert fluorinated oligomeric surfactant
J. bis(trifluoromethylsulfonyl)phenylmethane
K. Inert organosilicon surfactant All coatings were applied with a number 22 wire wound rod, except for examples 10, 12, 14 and 51 which were applied with a number 14 wire wound rod, and air dried overnight. Primed polyethyleneterephthalate was used as a substrate.

Samples were exposed for 3 days at 25.4 cm from a 275 watt sunlamp. The results were as follows in Table III.

Table III

| Ex. No. | A | B | C | D | E | F | G | H | I | J | K |
|---|---|---|---|---|---|---|---|---|---|---|---|
| 5 | — | 3 | 2 | — | — | — | 1.5 | 2.9 | 0.1 | 0.5 | — |
| 6 | — | 3 | — | 2 | — | — | 1.5 | 2.9 | 0.1 | 0.5 | — |
| 7 | — | 3 | — | 2 | — | — | 1.5 | 2.9 | — | 0.5 | 0.1 |
| 8 | 3 | — | — | 2 | — | — | 1.5 | 2.9 | — | 0.5 | 0.1 |
| 9 | — | 3 | — | 2 | — | — | 2.5 | 1.9 | 0.1 | 0.5 | — |
| 10 | — | 3 | 1 | 1 | — | 3.0 | — | 1.4 | 0.1 | 0.5 | — |
| 11 | — | 3 | 1 | 1 | — | — | 1.5 | 2.9 | 0.1 | 0.5 | — |
| 12 | — | 3 | 1 | — | 1 | 3.0 | — | 1.4 | 0.1 | 0.5 | — |
| 13 | — | 3 | 1 | — | 1 | — | 1.5 | 2.9 | 0.1 | 0.5 | — |
| 14 | — | 3 | 2 | — | — | 3.0 | — | 1.4 | 0.1 | 0.5 | — |
| 15 | — | 3 | — | 2 | — | 3.0 | — | 1.4 | 0.1 | 0.5 | — |

Examples 6, 7, 9, 10, 12, 14, and 15 showed no bloom or discoloration.

Examples 8 and 13 showed slight bloom on close examination, but no discoloration.

Examples 5 and 11 showed definite, but reduced bloom but no discoloration.

The bloom in Examples 5, 8, 11 and 13 occurred because less efficient flexibilizing epoxies were used with ultraviolet radiation absorbers which exhibit the greatest bloom properties. Bloom was still reduced. All coatings exhibited excellent abrasion resistance.

EXAMPLES 16–21

These examples show the usefulness of other catalyst systems. A standard formulation of 60 parts γ-glycidoxypropyltrimethoxysilane, 30 parts 1,4-butanediol diglycidylether, and 10 parts bis(3,4-epoxycyclohexylmethyl) succinate was prepared. To aliquots of this formulation were added various amounts of catalysts known to be useful in the cure of epoxy-terminated silanes. Among these were bis(trifluoromethylsulfonyl)-phenyl methane (BPM) (1.5% in ethyl acetate), tin tetrachloride (20% in 1,2-dichloroethane), antimony pentafluoride (5% in ClCF$_2$CFCl$_2$), antimony pentachloride (10% in 1,2-dichloroethane), and perchloric acid (10% in acetic acid). Various amounts of UV absorbers and 0.1% by weight of an organosilicone liquid of the formula

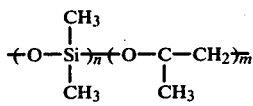

wherein m and n are whole integers of at least 2 such that the liquid has a mean average molecular weight ($\overline{Mn}$) of about 1500, a density of 0.99, and a viscosity of 125 centistokes at 25° C., were added before curing the compositions. After coating over color photographic film and curing to an abrasion resistant film, the samples were evaluated for bloom resistance, abrasion resistance and UV screening. All samples proved to be of high quality. The specific compositions were as follows, in addition to 10 parts of the standard curable composition. In Table IV the 2,4-dihydroxy benzophenone is represented as DHB, and 2-ethylhexyl-2-cyano-3,3-diphenylacrylate as ECD.

Table IV

| Example | Catalyst | Wt. % | UV Absorber | Wt. % |
|---------|----------|-------|-------------|-------|
| 16      | BPM      | 0.15  | DHB         | 5     |
| 17      | BPM      | 0.15  | ECD         | 5     |
| 18*     | SnCl$_4$ | 2.0   | DHB         | 5     |
| 19*     | SbF$_5$  | 0.25  | DHB         | 5     |
| 20*     | SbCl$_5$ | 0.5   | DHB         | 5     |
| 21*     | HClO$_4$ | 2.0   | DHB         | 5     |

*8-10% by weight of ethylacetate was necessary to keep these catalysts in the reactive solution.

Practice of the present invention was found to reduce blooming of the UV absorbers independent of the catalyst systems used.

As noted above, any substrate which is in need of protection from ultraviolet radiation might be protected by the coating composition of the present invention. The coating composition, having both reactive silane and epoxy groups will naturally adhere to many surfaces. Primers may be used to enhance adherence where necessary.

In the protection of conventional, wet-processed color photographic film or paper, it is necessary to place the protective coating over the viewing surface of the emulsion after development. The coating composition is generally impervious to aqueous materials and solvents, and if placed over the emulsion prior to development, developer solutions could not penetrate the coating to act upon the exposed emulsion. Certain color photographic elements contain developer solutions within the photographic element and need not be penetrated by developer solutions from outside the element. In such photographic element constructions, the abrasion resistant, ultraviolet absorbing coating may be applied to the element prior to development and prior to exposure. In fact, where active solutions are released in photographic film by the physical rupturing of capsules or layers, the provision of the coating of the present invention protects against scratching of the surface of the photographic element which occurs during the rupturing procedure as well as providing protection against fading of the dyes therein from ultraviolet radiation.

Although emphasis has been placed in the description of the present invention on protection of dyes from ultraviolet radiation, it should be apparent that any substrate which can be deleteriously affected by UV radiation may be protected with the compositions described herein. Polyolefins are notoriously subject to damage by ultraviolet radiation, vinyl resins are subject to severe discoloration problems from the cation of UV radiation, and both could be protected with coating compositions of the present invention. Any solid, rigid, or flexible substrate can be protected by these compositions although primers may be desirable in special instances.

Flexibility is another desirable aspect of the present invention in many uses. In protecting conventional color photographic materials, instant printing films, or motion pictures films, flexibility is required. The UV absorbing abrasion resistant compositions of the present invention, when coated onto a substrate or on a free film, can exhibit excellent flexibility. The coatings and films can easily be wound about a 15 cm diameter cylinder at room temperature, and often have sufficient flexibility to be wound about a 5 cm diameter cylinder. The substrates may be of any material. Particularly suitable are substrates of flexible or rigid synthetic polymer resins such as poly(vinylchloride), polycarbonate, polyethyleneterephthalate, acrylic resins, poly(vinyl-chloride-vinyl acetate) copolymers, isocyanate based resins, and polymethylmethacrylate. Painted surfaces are also usefully protected.

We claim:
1. An ultraviolet radiation absorbing, bloom resistant abrasion resistant film of between 0.5 and 50 microns comprising the reaction product of:
  (1) 30–90% by weight of reactive ingredients of an epoxy-terminated silane,
  (2) 10–70% by weight of reactive ingredients of an aliphatic polyepoxide having a molecular weight of at least 100 per epoxy group,
  (3) 0–20% by weight of reactive ingredients of a comonomer polymerizable with epoxy or silane groups, and
  (4) an ultraviolet absorbtive material present in sufficient amount so that the film absorbs at least 90% of all radiation between 290 and 400 nm, and is transmissive of at least 90% of all radiation between 400 and 780 nm, with no less than 75% transmissivity over any 50 nm range between 400 and 780 nm.

2. The film of claim 1 wherein the epoxy-terminated silane comprised 50–90% by weight of reactive ingredients, the flexibilizing epoxide material comprised 10–50% by weight of reactive ingredients, and the comonomer comprised 0–10% by weight of reactive ingredients.

3. The film of claim 2 bonded to a substrate.

4. The film of claim 2 wherein the film further contains from 0.01 to 10.0% by weight of an active organic aromatic onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

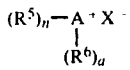

wherein
R$^5$ is an aromatic group at least as electron withdrawing as benzene,
R$^6$ is an alkyl or alkenyl group of 1 to 8 carbon atoms,
A is a Group Va, VIa, or VIIa atom,
X is an anion,
n is a positive whole integer of at least 2 up to the valence of A plus one,
a is 0 or a positive whole integer up to the valence of A minus one, and
n plus a is equal to the valence of A plus one.

5. The film of claim 1 wherein said epoxy-terminated silane is represented by the formulae:

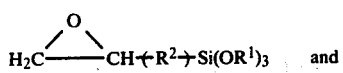 and

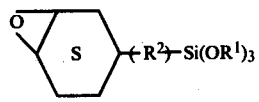

where R$^2$ is a non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, and R$^1$ is an aliphatic hydrocarbon group of less than 10 carbon atoms or an acyl group of less than 10 carbon atoms.

6. The film of claim 5 bonded to a substrate.

7. The film of claim 5 wherein the film further contains from 0.01 to 10.0% by weight of an active organic aromatic onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

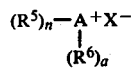

wherein
R$^5$ is an aromatic group at least as electron withdrawing as benzene,
R$^6$ is an alkyl or alkenyl group of 1 to 18 carbon atoms,
A is a Group Va, VIa, or VIIa atom,
X is an anion,
n is a positive whole integer of at least 2 up to the valence of A plus one,
a is 0 or a positive whole integer up to the valence of A minus one, and
n plus a is equal to the valence of A plug one.

8. The film of claim 1 bonded to a substrate.

9. The film bonded to a substrate of claim 8 wherein said substrate is photographic film.

10. The film bonded to a substrate of claim 8 wherein said substrate is instant color film.

11. The film bonded to a substrate of claim 8 wherein the film further contains from 0.01 to 10.0% by weight of an active organic aromatic onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

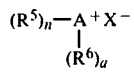

wherein
R$^5$ is an aromatic group at least as electron withdrawing as benzene,
R$^6$ is an alkyl or alkenyl group of 1 to 18 carbon atoms,
A is a Group Va, VIa, or VIIa atom,
X is an anion,
n is a positive whole integer of at least 2 up to the valence of A plus one,
a is 0 or a positive whole integer up to the valence of A minus one, and
n plus a is equal to the valence of A plus one.

12. The film of claim 1 wherein the film further contains from 0.01 to 10.0% by weight of an active organic aromatic onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

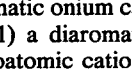

wherein
R$^5$ is an aromatic group at least as electron withdrawing as benzene,
R$^6$ is an alkyl or alkenyl group of 1 to 18 carbon atoms,
A is a Group Va, VIa, or VIIa atom,
X is an anion,
n is a positive whole integer of at least 2 up to the valence of A plus one,
a is 0 or a positive whole integer up to the valence of A minus one, and
n plus a is equal to the valence of A plus one.

13. The film of claim 1 wherein said epoxy-terminated silane is represented by the formula:

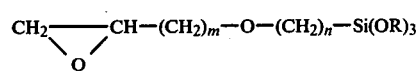

wherein m and n are independently 1 to 4 and R is an alkyl group of up to 6 carbon atoms.

14. The film of claim 13 bonded to a substrate.

15. The film bonded to a substrate of claim 14 wherein said substrate is motion picture film.

16. The film bonded to a substrate of claim 14 wherein said substrate comprises a rigid synthetic resin.

17. The film bonded to a substrate of claim 14 wherein said substrate comprises a flexible synthetic resin.

18. The film bonded to a substrate of claim 14 wherein said substrate comprises polyvinylchloride.

19. The film bonded to a substrate of claim 14 wherein said substrate comprises polycarbonate.

20. The film bonded to a substrate of claim 14 wherein said substrate comprises polyethylene terephthalate.

21. The film bonded to a substrate of claim 14 wherein said substrate comprises a flexible acrylic.

22. The film bonded to a substrate of claim 14 wherein said substrate comprises a poly(vinylchloridevinyl acetate) copolymer.

23. The film bonded to a substrate of claim 14 wherein said substrate comprises an isocyanate based resin.

24. The film bonded to a substrate of claim 14 wherein said substrate comprises polymethylmethacrylate.

25. The film bonded to a substrate of claim 14 wherein said substrate comprises a painted surface.

26. The film of claim 13 wherein the film further contains from 0.01 to 10.0% by weight of an active organic aromatic onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

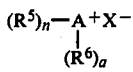

wherein
- $R^5$ is an aromatic group at least as electron withdrawing as benzene,
- $R^6$ is an alkyl or alkenyl group of 1 to 18 carbon atoms,
- A is a Group Va, VIa, or VIIa atom,
- X is an anion,
- n is a positive whole integer of at least 2 up to the valence of A plus one,
- a is 0 or a positive whole integer up to the valence of A minus one, and
- n plus a is equal to the valence of A plus one.

27. The film of claims 1, 2, or 13 having a thickness of from 1.0 to 20 microns.

28. A polymerizable composition comprising
(1) 30–90% by weight of an epoxy-terminated silane,
(2) 10–70% by weight of a polyepoxy resin of the formula

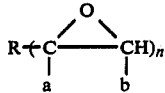

wherein R is an aliphatic or cycloaliphatic group, n is the valence of R and is an integer of 2 to 6, a and b are H or, when fused together, represent the atoms necessary to form a 5- or 6-membered cycloaliphatic ring, wherein said epoxy resin, upon homopolymerization provides a polymer having a glass transition temperature below +25° C., and wherein said epoxy resin has a molecular weight of at least 100 per epoxy group,
and sufficient ultraviolet radiation absorber to absorb at least 90% of all radiation between 290 and 400 nm through a wet film thickness of 20μ.

29. The polymerizable composition of claim 28 wherein said epoxy-terminated silane is represented by the formulae:

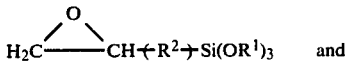 and

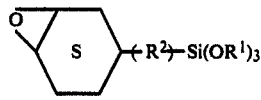

where $R^2$ is a non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, and $R^1$ is an aliphatic hydrocarbon group of less than 10 carbon atoms or an acyl group of less than 10 carbon atoms.

30. The polymerizable composition of claim 29 wherein said epoxy-terminated silane is represented by the formula

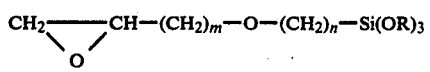

wherein m and n are independently 1 to 3 and R is an alkyl group of up to 6 carbon atoms.

31. The composition of claim 28 further comprising an onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

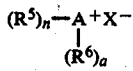

wherein
- $R^5$ is an aromatic group at least as electron withdrawing as benzene,
- $R^6$ is an alkyl or alkenyl group of 1 to 18 carbon atoms,
- A is a Group Va, VIa, or VIIa atom,
- X is an anion,
- n is a positive whole integer of at least 2 up to the valence of A plus one,
- a is 0 or a positive whole integer up to the valence of A minus one, and
- n plus a is equal to the valence of A plus one.

32. The composition of claim 29 further comprising an onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

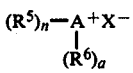

wherein
- $R^5$ is an aromatic group at least as electron withdrawing as benzene,
- $R^6$ is an alkyl or alkenyl group of 1 to 18 carbon atoms,
- A is a Group Va, VIa, or VIIa atom,
- X is an anion,
- n is a positive whole integer of at least 2 up to the valence of A plus one, a is 0 or a positive whole integer up to the valence of A minus one, and n plus a is equal to the valence of A plus one.

33. The composition of claim 30 further comprising an onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

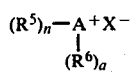

wherein $R^5$ is an aromatic group at least as electron withdrawing as benzene, $R^6$ is an alkyl or alkenyl group of 1 to 18 carbon atoms, A is a Group Va, VIa, or VIIa atom, X is an anion, n is a positive whole integer of at least 2 up to the valence of A plus one, a is 0 or a positive whole integer up to the valence of A minus one, and n plus a is equal to the valence of A plus one.

34. The film of claim 26 wherein said ultraviolet absorbtive material is selected from the group consisting of benzophenones and benzotriazoles.

35. The composition of claim 33 wherein said ultraviolet absorbtive material is selected from the group consisting of benzophenones and benzotriazoles.

* * * * *

UNITED STATES PATENT AND TRADEMARK OFFICE
CERTIFICATE OF CORRECTION

PATENT NO. : 4,156,046
DATED : May 22, 1979
INVENTOR(S) : Lien, Mehta, Soine & Zollinger It is certified that error appears in the above-identified patent and that said Letters Patent are hereby corrected as shown below:

Column 11, line 48, "alaong" should be --along--;

Column 17, claim 4, line 8, "1 to 8 carbon atoms" should be --1 to 18 carbon atoms--; and Column 19, claim 28, line 56, "+25°C." should be -- -25°C. --.

Signed and Sealed this

*Twenty-fifth* Day of *December 1979*

[SEAL]

*Attest:*

*Attesting Officer*

SIDNEY A. DIAMOND

*Commissioner of Patents and Trademarks*